United States Patent
Chen et al.

(10) Patent No.: US 11,225,193 B2
(45) Date of Patent: Jan. 18, 2022

(54) SURROUND VIEW SYSTEM AND METHOD THEREOF

(71) Applicant: Harman International Industries, Incorporated, Stamford, CT (US)

(72) Inventors: Liangfu Chen, Shanghai (CN); Min Xu, Shanghai (CN)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/753,745

(22) PCT Filed: Oct. 26, 2017

(86) PCT No.: PCT/CN2017/107830
§ 371 (c)(1),
(2) Date: Apr. 3, 2020

(87) PCT Pub. No.: WO2019/080051
PCT Pub. Date: May 2, 2019

(65) Prior Publication Data
US 2020/0276933 A1    Sep. 3, 2020

(51) Int. Cl.
*G06T 11/60* (2006.01)
*B60R 1/00* (2006.01)
*B60R 11/04* (2006.01)

(52) U.S. Cl.
CPC ............... *B60R 1/00* (2013.01); *B60R 11/04* (2013.01); *B60R 2300/105* (2013.01);
(Continued)

(58) Field of Classification Search
CPC .......... H04N 5/23296; H04N 5/23229; H04N 5/23293; H04N 7/18; B60R 1/00;
(Continued)

(56) References Cited

U.S. PATENT DOCUMENTS

| 2009/0079828 | A1* | 3/2009 | Lee | B62D 15/0275 |
|---|---|---|---|---|
| | | | | 348/148 |
| 2014/0114534 | A1* | 4/2014 | Zhang | H04N 5/23238 |
| | | | | 701/42 |

(Continued)

FOREIGN PATENT DOCUMENTS

| CN | 102474597 A | 5/2012 |
|---|---|---|
| CN | 105711499 A | 6/2016 |

(Continued)

OTHER PUBLICATIONS

ISA State Intellectual Property Office of the People's Republic of China, International Search Report and Written Opinion Issued in Application No. PCT/CN2017/107830, dated Jul. 17, 2018, WIPO, 10 pages.

(Continued)

*Primary Examiner* — Patrick E Demosky
(74) *Attorney, Agent, or Firm* — McCoy Russell LLP (57) ABSTRACT

The present invention is directed to a surround view system and method thereof. The surround view system comprises a surround image sensing module which obtains images of surrounding view and output image data, a vehicle status retrieval module which retrieves vehicle status information, a processing module which generates adaptive surround view based on the image data and the vehicle status information; and an outputting module which outputs the adaptive surround view.

18 Claims, 4 Drawing Sheets

(52) U.S. Cl.
  CPC ..... *B60R 2300/302* (2013.01); *B60R 2300/50* (2013.01); *B60R 2300/605* (2013.01); *B60R 2300/607* (2013.01)

(58) Field of Classification Search
  CPC ............... B60R 11/04; B60R 2300/105; B60R 2300/302; B60R 2300/50; B60R 2300/605; B60R 2300/607; G06T 11/60
  See application file for complete search history.

(56) References Cited

U.S. PATENT DOCUMENTS

| | | |
|---|---|---|
| 2014/0347450 A1 | 11/2014 | Han et al. |
| 2016/0301863 A1 | 10/2016 | Petrany et al. |
| 2017/0096106 A1* | 4/2017 | Higuchi .................. G06T 5/002 |
| 2018/0286095 A1* | 10/2018 | Kusayanagi ............ G06T 11/60 |
| 2019/0202356 A1* | 7/2019 | Cano ........................ B60R 1/00 |

FOREIGN PATENT DOCUMENTS

| | | | |
|---|---|---|---|
| JP | 2011004201 A | | 1/2011 |
| JP | 2011030078 A | | 2/2011 |
| JP | 2012253428 A | * | 12/2012 |
| JP | 2012253428 A | | 12/2012 |
| WO | 2017026083 A1 | | 2/2017 |

OTHER PUBLICATIONS

European Patent Office, Extended European Search Report Issued in Application No. 17929484.8, dated Mar. 26, 2021, Germany, 6 pages.

* cited by examiner

SURROUND VIEW SYSTEM AND METHOD THEREOF

CROSS-REFERENCE TO RELATED APPLICATIONS

The present application is a U.S. National Phase of International Patent Application Serial No. PCT/CN2017/107830 entitled "SURROUND VIEW SYSTEM AND METHOD THEREOF," filed on Oct. 26, 2017. The entire contents of the above-listed application are hereby incorporated by reference for all purposes.

FIELD

The present invention relates to a surround view system and a method performed in the surround view system, and specifically relates to a surround view system and a method that can adaptively transform a surround view.

BACKGROUND

In recent years, use of driver assistance, especially use of surround view systems has been proliferating. The existing surround view systems usually present a synthetic scene with a predetermined or fixed viewport. However, the driver may expect synthesized surround views with different details when the vehicle is moving at different speeds or turning in different directions. For example, when the vehicle is moving at a relatively low speed, the driver may expect synthesized surround views with more details regarding the nearby fields. Or, when the vehicle is turning in a different direction, the driver may expect synthesized surround views with more details in the direction to which the vehicle is turning. Therefore, there is a need for a system and a method for adaptive surround view transformation.

SUMMARY

A surround view system is provided to generate a surround view based on the image data and the vehicle status information. The surround view system may include a surround image sensing module which can obtain images of a surround view and output image data corresponding to the surround view. For example, the surround image sensing module may include a plurality of cameras provided at different locations on a vehicle. The surround view system may further include a vehicle status retrieval module which can retrieve vehicle status information. For example, the vehicle status retrieval module may include a plurality of vehicle status sensors which can sense the status of the vehicle and generate the vehicle status information. Furthermore, the surround view system may further include a processing module that may generate an adaptive surround view based on the vehicle status information received from the vehicle status retrieval module. The surround view system may further include an outputting module configured to output the adaptive surround view.

Moreover, a method is provided to generate a surround view based on the image data and the vehicle status information. The method comprises obtaining images of a surround view and outputting image data corresponding to the surround view; retrieving vehicle status information; generating an adaptive surround view based on the image data and the vehicle status information; and outputting the adaptive surround view.

Other systems, methods, features and advantages will be, or will become, apparent to one with skill in the art upon examination of the following figures and detailed description. It is intended that all such additional systems, methods, features and advantages be within the scope of the invention.

BRIEF DESCRIPTION OF THE FIGURES

The features, nature, and advantages of the present application may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

It is to be understood that the following description of examples of implementations are given only for the purpose of illustration and are not to be taken in a limiting sense. The partitioning of examples in function blocks, modules or units shown in the drawings is not to be construed as indicating that these function blocks, modules or units are necessarily implemented as physically separate units. Functional blocks, modules or units shown or described may be implemented as separate units, circuits, chips, functions, modules, or circuit elements. One or more functional blocks or units may also be implemented in a common circuit, chip, circuit element or unit.

With respect to one embodiment of the surround view system, the surround view system or an aspect of the surround view system may include a surround image sensing module which can obtain images of a surround view and output image data corresponding to the surround view. For example, the surround image sensing module may include a plurality of cameras provided at different locations on a vehicle. The cameras may generate image data of the vehicle's surroundings (such as image data comprising surroundings of a vehicle).

Furthermore, the surround view system or an aspect of the surround view system may further include a vehicle status retrieval module which can retrieve vehicle status information. For example, the vehicle status retrieval module may include a plurality of vehicle status sensors which can sense the status of the vehicle and generate the vehicle status information. The vehicle status information may include at least one of a vehicle speed, a vehicle gear status, and a steering wheel angle.

Furthermore, the surround view system or an aspect of the surround view system may further include a processing module that generates an adaptive surround view based on the image data and the vehicle status information received from the vehicle status retrieval module. That is, the processing module is capable of synthesizing a virtual environment of the surroundings based on the image data and the vehicle status information received from the vehicle status retrieval module.

Furthermore, the processing module may further include a viewport transform composition module which receives the vehicle status information from the vehicle status retrieval module, and generates a transformed viewport information. The transformed viewport information includes a position of a virtual vehicle and a view angle of a virtual vehicle. For example, the viewport transform composition module may further adapt a position of the virtual camera in a virtual environment based on the status information, and wherein the virtual vehicle is placed in the bottom centre of the virtual environment. For example, the viewport transform composition module may transform the position of the virtual camera far away from the virtual vehicle when the vehicle speed increases, and may transform the view angle of the virtual camera to enlarge coverage of a scene view when the vehicle speed increases.

Furthermore, the processing module may further include an adaptive surround synthesis module which receives the image data from the surround image sensing module and the transformed viewport information from the viewport transform composition module, and generates an adaptive surround view based on the transformed viewport information. For generating the surround view, the adaptive surround synthesis module may be configured to project the image data in a bowl shaped virtual environment, and generate an adaptive surround view considering the transformed viewport information. Particularly, the adaptive surround synthesis module may use a virtual camera viewport from which the vehicle surround view may be viewed in order to generate a virtual user view. The virtual camera viewport may include a position and/or a view angle from where a virtual camera views a vehicle and surroundings. For example, the virtual camera viewport may comprise a position of the virtual camera and a view angle of the virtual camera.

Furthermore, the surround view system or an aspect of the surround view system may further include an outputting module which outputs the adaptive surround view. For example, the outputting module is a display or a recording device that is capable of recording the surround view.

Figure 1:
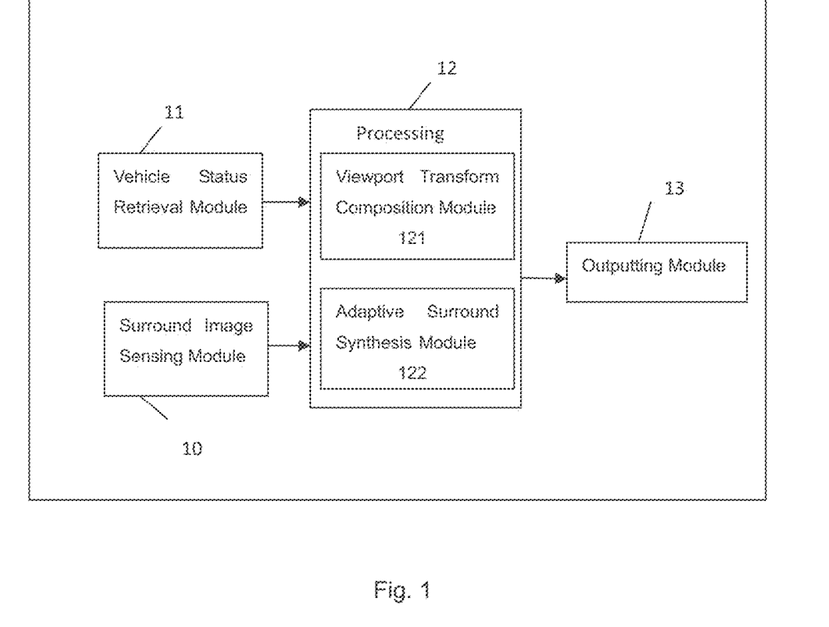
FIG. 1 illustrates a block diagram of an example surround view system according to the present application.

FIG. 1 shows a block diagram of an example surround view system according to the present application.

As shown in FIG. 1, the surround view system 1 comprises a surround image sensing module 10, a vehicle status retrieval module 11, a processing module 12, and an outputting module 13. The processing device 12 includes a viewport transform composition module 121 and an adaptive surround synthesis module 122.

The surround image sensing module 10 may include multiple cameras that are provided on different locations of the vehicle. The cameras can obtain images of the surrounding environment and output image data. All cameras may be accurately calibrated during factory manufacture process, thus both intrinsic parameters and extrinsic parameters of the cameras can be obtained. During the image retrieval process, input raw images are undistorted using calibrated intrinsic parameters, and then the undistorted image data are mapped to a bowl-shaped virtual environment.

The vehicle status retrieval module 11 retrieves vehicle status information, such as vehicle speed (current driving speed), vehicle gear status and steering wheel angle. These vehicle status information can be retrieved via either CAN bus or other interfaces. Usually, the signals regarding the vehicle status information are filtered smoothly with low-pass filters in order to avoid noise inputs. The vehicle status retrieval module 11 may comprises a plurality of sensors.

The processing module 12 may generate an adaptive surround view based on the image data received from the surround image sensing module 10 and the vehicle status information received from the vehicle status retrieval module 11.

For example, the viewport transform composition module 121 of the processing module 12 receives the vehicle status information from the vehicle status retrieval module 11, and generates transformed viewport information.

The viewport transform composition module 121 considers the following factors which will affect generation of the synthetic surround view scene with optimal view-port. For example, the factors may include a vehicle speed, which is highly correlated with field of view (FOV), a view angle which will affect the coverage of the scene view, and so on. For example, the scene view may include a front scene view and a side scene view.

For example, the viewport transform composition module 121 may perform the view-port transformation by transforming the position of the virtual camera far away from the virtual vehicle in the virtual environment when the vehicle speed increases. In a virtual environment for displaying, the virtual vehicle is placed on the centre of the bottom. For example, the virtual environment may be a bowl-shape virtual environment. Moreover, the viewport transform composition module 121 may transform the view angle to enlarge the coverage of the scene view, for example, transform the front view angle so that more scenes at the front are shown to the driver when the vehicle speed increases. Furthermore, a vehicle turning angle is highly correlated to a side view angle, as drivers can see more scenes in the direction they would drive to. The vehicle turning angle may include a steering wheel angle.

Figure 2:
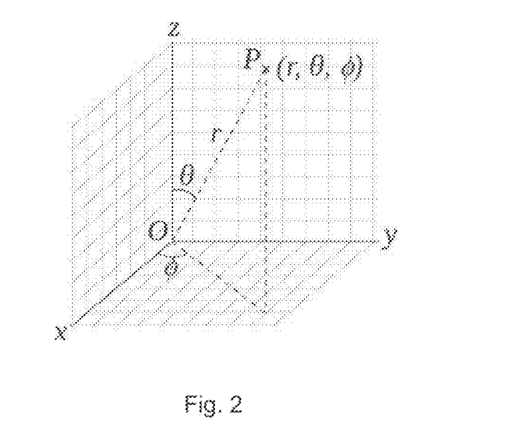
FIG. 2 illustrates a schematic view of an example spherical coordinate system according to the present application.
Figure 3A:
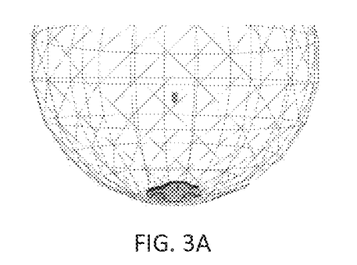
FIG. 3 illustrates a schematic view of an example virtual camera transformation when the vehicle speed changes according to the present application.
Figure 3B:
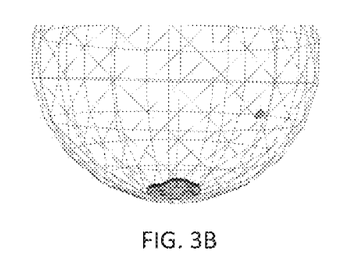
Figure 3C:
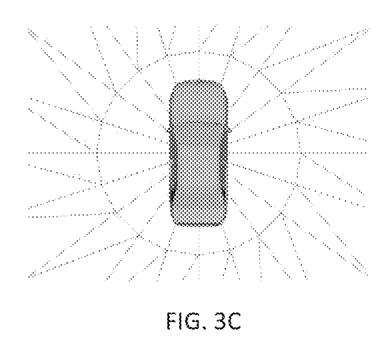
Figure 3D:
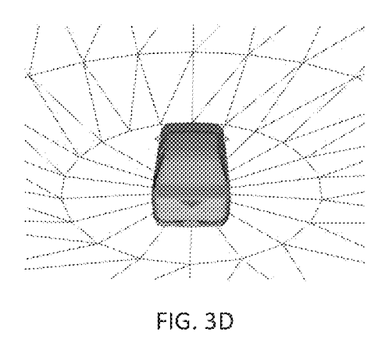

Here, a specific example of view-port modeling algorithm is illustrated as follows: FIG. 2 shows a spherical coordinate system with a radial distance r, a polar angle θ, and an azimuthal angle ϕ. Furthermore, a forward driving speed may be defined as s, a turning angle (e.g., a steering wheel angle) may be defined as α, whereas an inverse driving speed may be modeled as s with a negative value. In the virtual environment, a virtual vehicle is placed at the center of the bottom, wherein the X-axis represents a front-to-back direction, the Y-axis represents a left-to-right direction of the vehicle, and the Z-axis represents a top-to-bottom direction.

The virtual camera is transformed within a spherical coordinate system, where the virtual vehicle is placed at the origin O, and the virtual camera is placed on top of the vehicle, the position (coordinate) of the virtual camera is P (r, θ, ϕ) when the current driving speed of the vehicle is zero.

It is reasonable to define the distance from the center of the virtual vehicle to the virtual camera r and the polar angle θ are positively correlated with the driving speed s. Similarly, the turning angle α is positively correlated to the azimuthal angle ϕ in the spherical coordinate system. The correlations among them are shown as follows:

$$r \approx s$$

$$\theta \approx s$$

$$\phi \approx \alpha.$$

To get a reasonable surround view output, the pose of the virtual camera may be limited, which may be for example as follows:

$$-60° < \theta < 60°$$

$$-90° < \phi < 90°$$

wherein θ is a positive value when the vehicle is moving forward, and is a negative value when the vehicle is moving backward. In this way, a dynamic view range transformation (e.g., forward and backward) can be obtained according to driving speed. Similarly, φ may be defined to be positive when the vehicle is turning to the left direction, and may be defined to be negative when the vehicle is turning to the right direction.

The mapping from a driving speed range $S_b \sim S_f$ and a turning angle range $\alpha_l \sim \alpha_r$ to a view angle range could be done for example by the following linear mapping:

$$r = \frac{r_0}{s_f - s_b} s$$

$$\theta = \frac{\theta_{max} - \theta_{min}}{s_f - s_b} s$$

$$\phi = \frac{\phi_{max} - \phi_{min}}{\alpha_r - \alpha_l} \alpha$$

wherein $r_0$ is the distance from a virtual camera to a virtual vehicle when the driving speed of the vehicle is zero; $S_f$ and $S_b$ represent respectively a forward max speed and a backward max speed; $\alpha_l$ and $\alpha_r$ represent respectively a left max turning angle and a right side max turning angle.

For example, the abovesaid mapping can be further defined by the weight parameters $w_r$, $w_\theta$, $w_\phi$, along with bias parameters $b_r$, $b_\theta$, $b_\phi$. Then, the abovesaid mapping could be defined as follows:

$$r = w_r \frac{r_0}{s_f - s_b} s + b_r$$

$$\theta = w_\theta \frac{\theta_{max} - \theta_{min}}{s_f - s_b} s + b_\theta$$

$$\phi = w_\phi \frac{\phi_{max} - \phi_{min}}{\alpha_r - \alpha_l} \alpha + b_\phi$$

The parameters $w_r$, $w_\theta$, $w_\phi$, $b_r$, $b_\theta$, $b_\phi$, can be fine-tuned, for example, during manufacturing process, which enables the smooth view-port transform with arbitrary speed and turning angle as inputs.

Then, Cartesian coordinates can be obtained by applying the following transform:

$$x = r \sin(\theta) \cos(\phi)$$

$$y = r \sin(\theta) \sin(\phi)$$

$$z = r \cos(\theta)$$

The results, i.e., the transformed position and the view angle of the virtual camera are then passed to the adaptive surround synthesis module 122 for synthetic scene generation.

The adaptive surround synthesis module 122 receives the image data from the surround image sensing module 10 and the transformed viewport information from the viewport transform composition module 121, and generates an adaptive surround view based on the transformed viewport information. The transformed viewport may include a position and a view angle of the virtual camera. For generating the surround view, the adaptive surround synthesis module 122 may be configured to project the image data in a bowl shaped virtual environment, and generate adaptive surround view taking into consideration the transformed viewport information. The adaptive surround synthesis module 122 may use a virtual camera position from which the vehicle surround view may be viewed in order to generate a virtual user view. The virtual camera position may be a location and/or direction from where a virtual camera views a vehicle and surroundings and the virtual user view may be a virtual view from the virtual camera position. For example, with generated bowl-shaped virtual environment and the above-said viewport transform information, a virtual scene can be synthesized with typical graphics modelling interfaces, such as OpenGL and DirectX.

The outputting module 13 outputs the adaptive surround view. For example, the outputting module may include a display or a recorder. For example, this outputting module 13 may display the by-passed synthesized bird's-eye view, or encode the generated imaging result into files and save them into a storage device.

The surround view system 1 may be operable to automatically change the position and the view angle of the virtual camera when the vehicle changes the driving speed or the turning angle. Thus, the surround view system 1 can generate smooth viewport transform of surround view, which provides better user experience compared to the existing system that uses a fixed viewport.

For example, the surround view system 1 may enable users to see relatively more details or more scenes in the direction where they would drive to by transforming the virtual camera in a bowl shaped environment and taking into consideration the vehicle speed and turning angle.

Figure 4A:
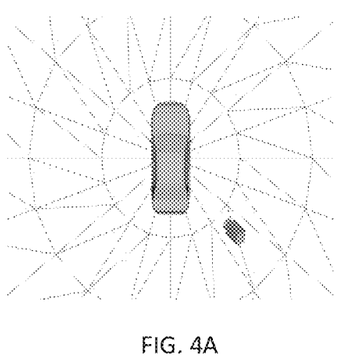
FIG. 4 illustrates a schematic view of an example virtual camera transformation when the vehicle is turning left according to the present application.
Figure 4B:
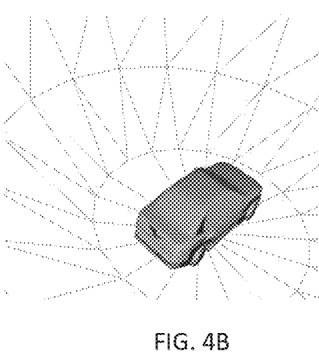

FIG. 3 and FIG. 4 respectively illustrate a schematic view of an example virtual camera transformation during the vehicle speed changes, and a schematic view of an example virtual camera transformation when the vehicle is left turning according to the present application.

For example, as shown in FIG. 3, when the driving speed increases from 5 mph to 30 mph, the virtual camera interpolates its position and view angle from 3A to 3B. Then, the driver would get the synthetic surround view interpolated from 3C to 3D, respectively.

For example, FIG. 4 shows how the vehicle turning angle affects the virtual cameras to translate between two sides of a vehicle. As shown in FIG. 4, the virtual camera 4A is translated and rotated to the right of the vehicle in cases where the steering wheel is turned to the left and the vehicle is moving forward.

Through the surround view system 1, a synthetic scene can be generated taking into consideration both the vehicle turning angle and the vehicle speed, and thus the viewport transformation can be optimized to enlarge the area where drivers expect to see clearly. The surround view system 1 may also be a dynamic digital video recording system that obtains road scenes to show the truth as evidence.

Figure 5:
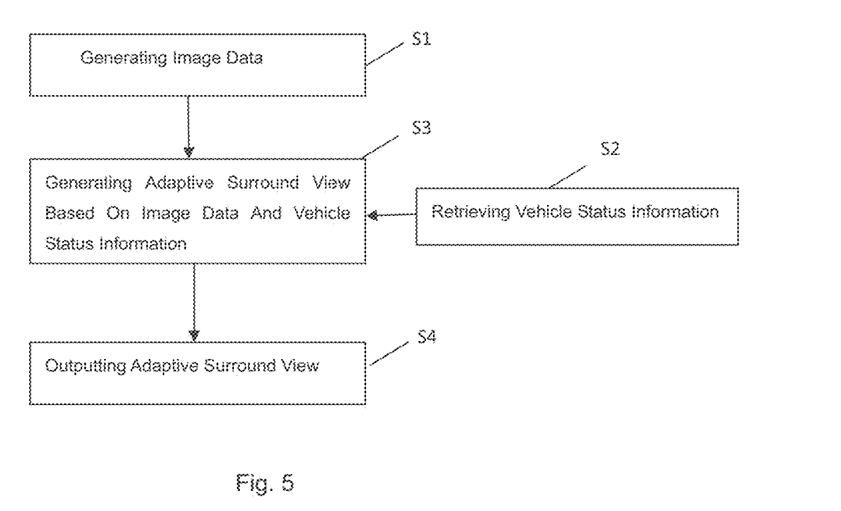
FIG. 5 illustrates a flowchart indicating how a surround view may be generated and adapted.

FIG. 5 illustrates a flowchart indicating how an adaptive surround view may be generated and adapted. At S1, images of a surround view and output image data can be obtained by the surround image sensing module (such as cameras) 10. The image data covers the vehicle and the surrounding of the vehicle.

At S2, vehicle status information is retrieved by the vehicle status retrieval module (such as image sensors) 11.

At S3, the processing module 12 generates an adaptive surround view based on the image data and the vehicle status information. For example, the viewport transform composition module 121 receives the vehicle status information from the vehicle status retrieval module and determines whether the vehicle status changes. If it changes, then the viewport transform composition module 121 generates a transformed viewport based on the vehicle status information. The transformed viewport information comprises a position and a view angle of a virtual camera in a virtual environment. The vehicle status information may include at least one of a vehicle speed, a vehicle gear status and a vehicle turning angle information, and so on. The viewport transform composition module 121 adapts the position of the virtual camera in the virtual environment based on the vehicle status information, and wherein the virtual vehicle is placed in the bottom centre of the virtual environment. For example, when the vehicle speed increases, the virtual camera may be transformed far away from the virtual vehicle, and/or the view angle of the virtual camera is transformed to enlarge coverage of the scene view when the vehicle speed increases. Then, the adaptive surround synthesis module 13 generates adaptive surround view based on the image data and the transformed position and the transformed view angle of the virtual camera.

At S4, an adaptive surround view is output by the outputting module 14. For example, the adaptive surround view can be displayed on a display or be recorded in the medium or other storage devices.

Using the described adaptive surround view system and method, a view port that is of interest to the driver can be adaptively transformed. For example, the driver can be shown more details nearby when the vehicle is driving at low speed, or with more details in the direction to which the vehicle is turning.

For example, when a vehicle is moving at a higher speed, a larger range of surround view is provided, since relative details around the vehicle are less important when moving at a high speed. Similarly, when a vehicle is turning to one direction, more details on that direction are expected to be shown, as the driver would expect to see whether there are any obstacles in that direction. Combining the driving speed and the vehicle turning angle together, a parametric viewport transformation of the virtual camera can be derived so as to display an optimal bird's eye view of the surroundings.

The term "module" may be defined to include a plurality of executable modules. The modules may include software, hardware, firmware, or some combination thereof executable by a processor. Software modules may include instructions stored in memory, or another memory device, that may be executable by one or more processors. Hardware modules may include various devices, components, circuits, gates, circuit boards, and the like that are executable, directed, or controlled for performance by the processor.

A computer readable medium or machine readable medium may include any non-transitory memory device that includes or stores software for use by or in connection with an instruction executable system, apparatus, or device. The machine readable medium may be an electronic, magnetic, optical, electromagnetic, infrared, or semiconductor system, apparatus, or device. Examples may include a portable magnetic or optical disk, a volatile memory such as Random Access Memory "RAM", a read-only memory "ROM", or an Erasable Programmable Read-Only Memory "EPROM" or Flash memory. A machine readable memory may also include a non-transitory tangible medium upon which software is stored. The software may be electronically stored as an image or in another format (such as through an optical scan), then compiled, or interpreted or otherwise processed.

The term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

The computer-readable medium may include a solid-state memory such as a memory card or other package that houses one or more non-volatile read-only memories. The computer-readable medium may be a random access memory or other volatile re-writable memory. The computer readable medium may include a magneto-optical or optical medium, such as a disk or tapes or other storage device to obtain carrier wave signals such as a signal communicated over a transmission medium. A digital file attachment to an e-mail or other self-contained information archive or set of archives may be considered a distribution medium that is a tangible storage medium.

In alternative examples, dedicated hardware implementations, such as application specific integrated circuits, programmable logic arrays and other hardware devices, may be constructed to implement various parts of the system. Applications that may include the apparatus and systems can broadly include a variety of electronic and computer systems. One or more examples described may implement functions using two or more specific interconnected hardware modules or devices with related control and data signals that can be communicated between and through the modules, or as portions of an application-specific integrated circuit.

The system described may be implemented by software programs executable by a computer system. Implementations can include distributed processing, component/object distributed processing, and parallel processing. Alternatively, virtual computer system processing can be constructed to implement various parts of the system.

The system is not limited to operation with any particular standards and protocols. For example, standards for Internet and other packet switched network transmission (e.g., TCP/IP, UDP/IP, HTML, HTTP) may be used. Replacement standards and protocols having the same or similar functions as those disclosed may also or alternatively be used.

To clarify the use in the pending claims and to hereby provide notice to the public, the phrases "at least one of <A>, <B>, . . . and <N>" or "at least one of <A>, <B>, . . . , <N>, or combinations thereof" are defined by the Applicant in the broadest sense, superseding any other implied definitions here before or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A surround view system, comprising:
a surround image sensing module comprising cameras configured to obtain images from a plurality of cameras of a surround view and output image data corresponding to a surround image;
a vehicle status retrieval module configured to retrieve vehicle status information of a vehicle, the vehicle status retrieval module including a plurality of vehicle status sensors that sense and generate vehicle status information, where the vehicle status information includes a current driving speed of the vehicle;
a processing module configured to generate an adaptive surround view based on the image data and the vehicle status information, wherein the processing module is a computer processing system; and
an outputting module configured to output the adaptive surround view, the outputting module including a display or a recorder,
wherein the adaptive surround view includes a virtual vehicle and a virtual camera,
wherein the virtual vehicle is positioned at an origin of a spherical coordinate system with a virtual camera on top of the virtual vehicle in the adaptive surround view when the current driving speed of the vehicle is zero, and
wherein the position of the virtual camera is changed from on top of the virtual vehicle to be behind the virtual vehicle responsive to an increase in the current vehicle speed while maintaining the virtual vehicle positioned at the origin.

2. The surround view system according to claim 1, wherein the processing module comprises:
a viewport transform composition module of the processing module configured to receive the vehicle status information from the vehicle status retrieval module and generate transformed viewport information comprising a position of the virtual vehicle and a view angle of the virtual vehicle; and
an adaptive surround synthesis module of the processing module configured to receive the image data from the surround image sensing module and the transformed viewport information from the viewport transform composition module, and generate the adaptive surround view based on the image data and the transformed viewport information.

3. The surround view system according to claim 2, wherein the transformed viewport information comprises a position and a view angle of the virtual camera in a virtual environment.

4. The surround view system of claim 2, wherein the vehicle status information comprises at least one of the current vehicle speed, a vehicle gear status, and a vehicle turning angle.

5. The surround view system according to claim 4, wherein the viewport transform composition module is further configured to enlarge the view angle of the virtual camera when the vehicle speed increases.

6. The surround view system according to claim 1, wherein the outputting module is a display or a recording device that is capable of storing the surround view.

7. The surround view system according to claim 1, wherein the cameras of the surround image sensing module are positioned at different locations of the vehicle.

8. A method of a surround view system, comprising:
obtaining images of a surrounding view and outputting image data corresponding to the surround image;
retrieving vehicle status information;
generating an adaptive surround view in a spherical coordinate system based on the image data and the vehicle status information; and
outputting the adaptive surround view,
wherein the adaptive surround view includes a virtual vehicle positioned at an origin of the spherical coordinate system with a virtual camera on top of the virtual vehicle when a current vehicle speed is zero, and
wherein a position of the virtual camera is changed from on top of the virtual vehicle to a position behind the virtual vehicle responsive to an increase in the current vehicle speed while maintaining the virtual vehicle at the origin.

9. The method according to claim 8, wherein generating the adaptive surround view based on the image data and the vehicle status information comprises:
generating a transformed viewport information based on the vehicle status information; and
generating the adaptive surround view based on the image data and the transformed viewport information.

10. The method according to claim 9, wherein the transformed viewport information comprises a view angle of a virtual camera in a virtual environment.

11. The method according to according to claim 8, wherein the vehicle status information includes at least one of the current vehicle speed, a vehicle gear status, and a vehicle turning angle information.

12. The method according to claim 9, wherein generating the transformed viewport information based on the vehicle status information comprises transforming the position of the virtual camera relative to the virtual vehicle when the vehicle speed increases.

13. The method according to claim 9, wherein generating a transformed viewport information based on the vehicle status information comprises enlarging the view angle of the virtual camera when the vehicle speed increases.

14. The method according to claim 9, wherein outputting the adaptive surround view comprises displaying or recording the adaptive surround view.

15. The surround view system of claim 3, wherein the virtual camera is transformed within a spherical coordinate system, wherein the virtual camera is placed on top of the vehicle and the coordinate of the virtual camera is $P(r, \theta, \phi)$, wherein r is a radial distance from a center of a virtual vehicle to a virtual camera of the plurality of cameras, $\theta$ is a polar angle, and $\phi$ is an azimuthal angle.

16. The surround view system of claim 15, wherein a pose of the virtual camera is limited to:

$$-60° < \theta < 60°$$

$$-90° < \phi < 90°.$$

17. The surround view system of claim 16, wherein the transformed viewport information is calculated by using a driving speed range $S_b$ to $S_f$ and turning angle range $\alpha_l$ to $\alpha_r$ to update the position and the view angle of the virtual camera according to:

$$r = \frac{r_0}{S_f - S_b} s$$

$$\theta = \frac{\theta_{max} - \theta_{min}}{S_f - S_b} s$$

-continued $$\phi = \frac{\phi_{max} - \phi_{min}}{\alpha_r - \alpha_l}\alpha$$

wherein $r_0$ is a distance from the virtual camera to the virtual vehicle when the driving speed of the vehicle is zero, $s_f$ is a forward maximum speed, $s_b$ is a backward maximum speed, $\alpha_l$ is a left side maximum turning angle, $\alpha_r$ is a right side maximum turning angle and s is a current driving speed, and $\alpha$ is a turning angle of the vehicle, where $\theta_{max}$ and $\theta_{min}$ are maximum and minimum bounds of the polar angle $\theta$, respectively, and where $\phi_{max}$ and $\phi_{min}$ are maximum and minimum bounds of the azimuthal angle $\phi$, respectively.

18. A method of a surround view system, comprising:

obtaining images of a surrounding view and outputting image data corresponding to the surround image;

retrieving vehicle status information;

generating an adaptive surround view in a spherical coordinate system based on the image data and the vehicle status information; and outputting the adaptive surround view, wherein the adaptive surround view includes a virtual vehicle positioned at an origin of the spherical coordinate system with a virtual camera positioned on top of the virtual vehicle when a current vehicle speed is zero, and responsive to the current vehicle speed increasing and based on a vehicle turning angle, a position of the virtual camera is changed from on top of the virtual vehicle to a position behind the virtual vehicle and translated to a side of the virtual vehicle while maintaining the vehicle at the origin.

* * * * *